UNITED STATES PATENT OFFICE.

HIRAM J. DREHER, OF PHILADELPHIA, PENNSYLVANIA, ASSIGNOR OF THREE-FOURTHS HIS RIGHT TO PHŒNIX PLUMBAGO MINING COMPANY, OF SAME PLACE.

IMPROVEMENT IN STOVE-POLISHES.

Specification forming part of Letters Patent No. 206,868, dated August 13, 1878; application filed June 12, 1878.

*To all whom it may concern:*

Be it known that I, HIRAM J. DREHER, of the city and county of Philadelphia, and State of Pennsylvania, have invented a new and useful Improvement in Stove-Polish, which improvement is fully set forth in the following specification.

My invention consists of a stove-polish of the form of paste. In preparing this compound I take, say, one hundred pounds of saponified fat, tallow, or grease, sixty-five pounds of crude plumbago, two pounds of silicate of soda, and two pounds of glycerine. The plumbago is added to the saponified fat in a hot state, after which the silicate of soda and glycerine are added, likewise in a hot state, the result being a mass of pasty consistency, said mass being retained in the form of a paste by the use of the glycerine.

For cold climates, five parts of some saccharine substance may be added to the mass to prevent congealing thereof.

I am aware that it is not new to form a stove-polish of plumbago, soap, and glycerine. Pure or purified plumbago is expensive for the purpose of a stove-polish. The foreign matter in the crude material exists in great quantities; and while this is thrown aside in other cases I utilize it as a body, and yet preserve all the properties of the pure plumbago, while the preparation is made at small expense.

Having thus described my invention, what I claim as new, and desire to secure by Letters Patent, is—

The composition of matter or stove-polish consisting of saponified fat, crude plumbago, and glycerine, in combination with silicate of soda, substantially as and for the purpose set forth.

H. J. DREHER.

Witnesses:
JOHN A. WIEDERSHEIM,
H. E. GARSED.